(12) United States Patent
Chambliss et al.

(10) Patent No.: US 8,473,960 B2
(45) Date of Patent: Jun. 25, 2013

(54) VECTOR THROTTLING TO CONTROL RESOURCE USE IN COMPUTER SYSTEMS

(75) Inventors: David D. Chambliss, Morgan Hill, CA (US); Prashant Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 12/889,741

(22) Filed: Sep. 24, 2010

(65) Prior Publication Data

US 2012/0079492 A1 Mar. 29, 2012

(51) Int. Cl.
*G06F 9/46* (2006.01)
*G06F 15/173* (2006.01)
*G06F 17/00* (2006.01)

(52) U.S. Cl.
USPC ........... 718/104; 718/101; 718/102; 718/103; 718/105; 709/201; 709/202; 709/203; 709/223; 709/224; 709/225; 709/226; 705/400

(58) Field of Classification Search
None
See application file for complete search history.

(56) References Cited

U.S. PATENT DOCUMENTS

| | | | |
|---|---|---|---|
| 7,362,766 B2 | 4/2008 | Karlsson et al. | |
| 7,401,244 B2 | 7/2008 | Hellerstein et al. | |
| 7,460,549 B1 | 12/2008 | Cardei et al. | |
| 8,151,269 B1* | 4/2012 | Brown et al. | 718/103 |
| 2002/0161868 A1* | 10/2002 | Paul et al. | 709/221 |
| 2003/0046396 A1 | 3/2003 | Richter et al. | |
| 2004/0003087 A1* | 1/2004 | Chambliss et al. | 709/226 |
| 2004/0006638 A1* | 1/2004 | Oberlander et al. | 709/232 |
| 2007/0074057 A1* | 3/2007 | Hellerstein et al. | 713/300 |
| 2008/0306950 A1* | 12/2008 | Richards et al. | 707/8 |
| 2009/0138616 A1 | 5/2009 | Alvarez et al. | |
| 2009/0219940 A1* | 9/2009 | Jansson | 370/401 |
| 2010/0077449 A1 | 3/2010 | Kwok et al. | |
| 2012/0016721 A1* | 1/2012 | Weinman | 705/7.35 |

OTHER PUBLICATIONS

Rui Zhang, David Chambliss, Prashant Pandey, "Effective Quality of Service Differentiation for Real-world Storage Systems", pp. 1-14.

* cited by examiner

*Primary Examiner* — Emerson Puente
*Assistant Examiner* — Adam Lee
(74) *Attorney, Agent, or Firm* — Cantor Colburn LLP

(57) ABSTRACT

Embodiments are provided for managing the system performance of resources performing tasks in response to task requests from tenants. In one aspect, a system that comprises at least one resource configured to perform at least one admitted task with an impact under the control of a computer system. The computer system provides services to more than one tenant. The computer system comprises a strategist configured to assess the impact of the admitted task to create a cost function vector containing multiple cost function specifications and a budget policy vector containing multiple budget policies and an actuator. The actuator receives the cost function vector and the budget policy vector from the strategist, receives a task request one of the more than one tenants, and calculates cost functions based upon the cost function vector to predict the impact of the task request on the resources for each of the task requests. The actuator throttles the task requests based upon the budget policies for the impact on the resources to create at least one of the admitted task performed by the resource and a delayed task request.

20 Claims, 5 Drawing Sheets

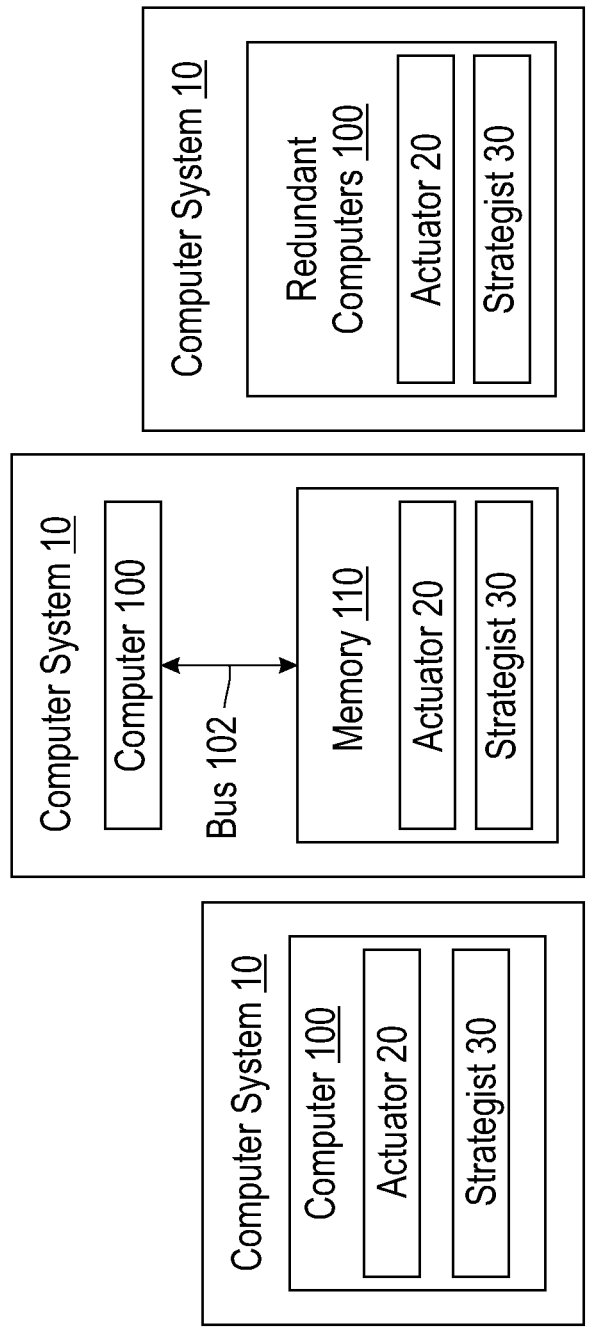

VECTOR THROTTLING TO CONTROL RESOURCE USE IN COMPUTER SYSTEMS

BACKGROUND

The present invention relates generally to system performance management, and more particularly, to systems used to manage the system performance of resources performing tasks in response to task requests from tenants.

By way of background, computer systems are commonly put to many different tasks that use system resources to provide for different needs. Different people and/or companies and/or organizations, pay service fees for the use of a computer system. These people, companies, and organizations are referred to as "tenants" of the computer system. A given person, company, or organization acting in different roles or engaging in different activities might accordingly be identified as a different tenant, according to the role or activity. Service fees may be generated by the resources managed by the computer system, based upon the system performance of the tasks requested by the tenants.

Different tenants typically use the computer system concurrently. Even though the tenants tend to be concerned almost exclusively with the performance experienced for their particular use, the computer system needs to manage the resources for all the tenants and to provide an acceptable level of quality to each tenant. This quality level is quantified as a measure of the quality of service. It is important that the quality of service or performance provided by the computer system does not become too slow, or fail to meet a deadline for work completion, or otherwise inconvenience a valued tenant. The value, the generated revenue and/or the quality of service of the computer system, can sometimes be increased by improving the performance delivered to a valued tenant, while decreasing performance for another tenant.

In a multiple tenant computer system, tenant tasks may or may not interfere with one another. A tenant might create a load on the resources that prevents other tenants from obtaining their required performance. However, the tenants are often prioritized, allowing for the shifting of resource utilization between tenants in order to improve the quality of service, or the revenues generated by the system.

Often the prioritization reflects the value of the tenant, indicating that some tenants are more valuable than others at any point in time. The computer system determines the priorities. For example, if a tenant uses the computer system to backup hard drives before the start of business, the failure to achieve that result could lead the tenant to switch to another backup service. Therefore, that tenant may have priority over other tasks at certain times. Another example is a tenant paying a larger service fee than another tenant for an ongoing task.

BRIEF SUMMARY

In one general embodiment, a system that comprises at least one resource configured to perform at least one admitted task with an impact. The admitted task admitted by a computer system, with the computer system providing services to more than one tenant. In one embodiment the computer system comprises a strategist for creating a cost function vector comprising multiple cost function specifications and a budget policy vector comprising multiple budget policies and an actuator. The actuator receives the cost function vector and the budget policy vector from the strategist. The actuator also receives at least one task request associated with one of the more than one tenants. The actuator also calculates cost values based upon the cost function vector to predict the impact of the at least one task request on the at least one resource for each of the at least one task requests. The actuator further throttles the at least one task requests based upon the cost values and budget policies for the impact on the at least one resource to create at least one of the admitted task performed by the at least one resource and a delayed task request.

In another embodiment a method that comprises operating a computer system as a strategist to assess an impact of at least one resource performing an admitted task to create a cost function vector comprising multiple cost function specifications and a budget policy vector comprising multiple budget policies. The computer system provides services to at least two tenants and operates as an actuator. The actuator receives the cost function vector and the budget policy vector from the strategist, receives at least one task request from one of the tenants, calculates cost functions based upon the cost function vector to predict the impact of the at least one task request on the at least one resource for each task request, and throttles the at least one task request based upon the budget policies for the impact on the at least one resource to create at least one of the admitted task performed by the resource and a delayed task request.

In another embodiment, a computer program product that comprises a computer readable storage medium having computer readable program code embodied therewith. The computer readable program code comprises computer readable program code configured to operate a computer system as a strategist to assess an impact of an admitted task performed on a resource to create a cost function vector containing multiple cost function specifications and a budget policy vector containing multiple budget policies, with the computer system providing services to at least two tenants. The computer readable program code is also configured to operate the computer system as an actuator. The actuator comprises computer readable program code configured to receive the cost function vector and the budget policy vector from the strategist, computer readable program code configured to receive a task request from at least one of the tenants, computer readable program code configured to calculate cost functions based upon the cost function vector to predict the impact of the task request on the resource for each task request received, and computer readable program code configured to throttle each task request based upon the budget policies for the impact on the resource to create at least one of the admitted task performed by the resource and a delayed task request.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which:

FIG. 5 to FIG. 7 are function block diagrams showing embodiments of a computer system that may include a memory containing the actuator and/or the strategist as an example of a computer program product;

DETAILED DESCRIPTION

Figure 1:
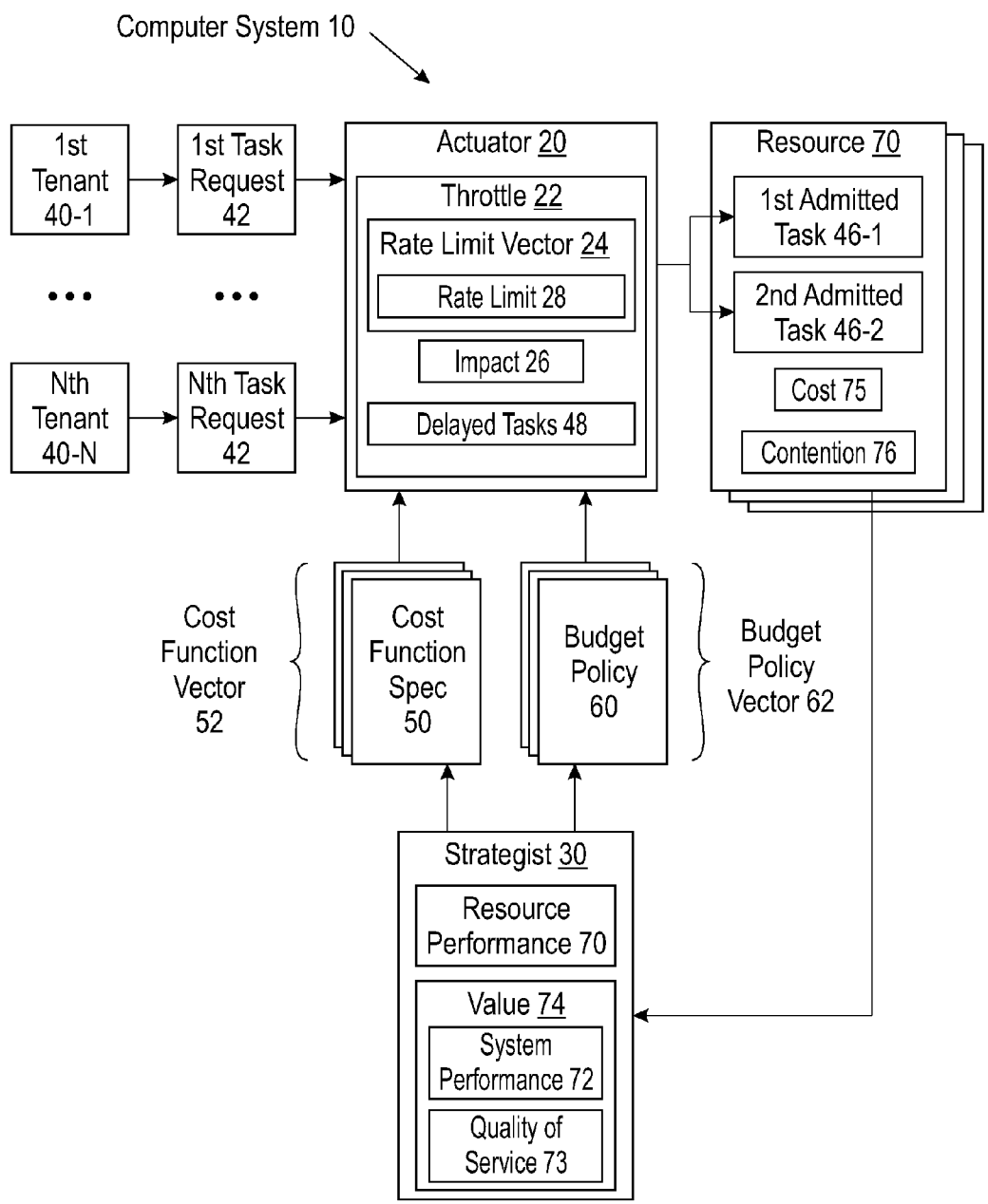
FIG. 1 is a functional block diagram showing an embodiment of a computer system operating at least one resource, an actuator, and a strategist.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In one general embodiment, a system that comprises at least one resource configured to perform at least one admitted task with an impact. The admitted task admitted by a computer system, with the computer system providing services to more than one tenant. In one embodiment the computer system comprises a strategist for creating a cost function vector comprising multiple cost function specifications and a budget policy vector comprising multiple budget policies and an actuator. The actuator receives the cost function vector and the budget policy vector from the strategist. The actuator also receives at least one task request associated with one of the more than one tenants. The actuator also calculates cost values based upon the cost function vector to predict the impact of the at least one task request on the at least one resource for each of the at least one task requests. The actuator further throttles the at least one task requests based upon the cost values and budget policies for the impact on the at least one resource to create at least one of the admitted task performed by the at least one resource and a delayed task request.

In another embodiment a method that comprises operating a computer system as a strategist to assess an impact of at least one resource performing an admitted task to create a cost function vector comprising multiple cost function specifications and a budget policy vector comprising multiple budget policies. The computer system provides services to at least two tenants and operates as an actuator. The actuator receives the cost function vector and the budget policy vector from the strategist, receives at least one task request from one of the tenants, calculates cost functions based upon the cost function vector to predict the impact of the at least one task request on the at least one resource for each task request, and throttles the at least one task request based upon the budget policies for the impact on the at least one resource to create at least one of the admitted task performed by the resource and a delayed task request.

In another embodiment, a computer program product that comprises a computer readable storage medium having computer readable program code embodied therewith. The computer readable program code comprises computer readable program code configured to operate a computer system as a strategist to assess an impact of an admitted task performed on a resource to create a cost function vector containing multiple cost function specifications and a budget policy vector containing multiple budget policies, with the computer system providing services to at least two tenants. The computer readable program code is also configured to operate the computer system as an actuator. The actuator comprises computer readable program code configured to receive the cost function vector and the budget policy vector from the strategist, computer readable program code configured to receive a task request from at least one of the tenants, computer readable program code configured to calculate cost functions based upon the cost function vector to predict the impact of the task request on the resource for each task request received, and computer readable program code configured to throttle each task request based upon the budget policies for the impact on the resource to create at least one of the admitted task performed by the resource and a delayed task request.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1 illustrates a functional block diagram of one general embodiment of a system 10 for managing performance. The system 10 may comprise a computer system 10 that manages performance of at least one resource 70 that is offered in response to task requests 42 presented by multiple tenants 40-1 to 40-N, where N is more than 1.

A tenant 40 is a label for a task request 42 used to determine what budget policy 60 is applied to accept, delay, or reject the task request 42. In one embodiment, the tenant 40 is determined from the person, company, or organization that has caused the task request 42 to be created, by operating a client computer system that generates task requests 42, for example. The tenant 40 may also be determined from the role assumed or activity engaged in by an agent generating task requests 42. For example, three distinct tenants 40-1, 40-2 and 40-3 might be identified with tasks associated with order processing, business analytics, and systems maintenance, respectively. In another embodiment, the tenant 40 is determined from the client machine from which the task request 42 is received. In an alternative embodiment, the tenant 40 is determined from a tenant-identification attribute supplied with the task request 42. Additionally, the tenant 40 is determined from a combination of any or all of the above.

The task requests 42 use one or more resources 70 that may be managed and/or controlled by the computer system 10. The computer system 10 includes an actuator 20. In one embodiment, the actuator 20 may comprise a distributed set of actuators. The actuator 20 controls the admission of task requests by throttling their admission as admitted tasks, shown here as 46-1 and 46-2 and a strategist 30 that sets the parameters that control the actuator 20.

In one embodiment, the strategist 30 evaluates the current resource performance being delivered and a value 74 created by that performance in terms of an overall system performance 72. The strategist 30 may also adjust the rate limits as found in the rate limit vector 24 allowed by the actuator 20 to improve the value 74. The actuator 20 implements a rate limit 28 by limiting one or more rates associated with a stream of task requests 42. There may be multiple rate limit vectors 24 in use by the actuator 20. Each tenant 40-1 to 40-N may be associated with a rate limit vector 24 at a given time. The rate limit vector 24 associated with two tenants, 40-1 to 40-N, may be the same or may be different, for example. The response of the actuator 20 to the task request 42 may be determined from the rate limit vector 24 associated with the tenant 40 making the task request 42.

The strategist 30 may program each of the rate limits 28 of the rate limit vector 24 as an estimate of the impact 26 of the admitted tasks 46-1 and 46-2 on one or more of the resources 70. The strategist 30 delivers to the actuator 20, a specification for a cost function, referred to as a cost function specification 50, along with a budget policy 60, for each of the rate limits 28 of the rate limit vector 24. The collection of the cost function specifications 50 will be referred to as the cost function vector 52 and the collection of the budget policies 60 will be referred to as the budget policy vector 62. The dimension of the rate limit vector 24 may match the cost function vector 52 and the budget policy vector 62 in certain examples.

The actuator 20 may use a cost function specification 50 to evaluate the cost 75 of requested tasks 42 as they are received, and may use the budget policy 60 to determine whether and when to incur the costs 75. As the task requests 42 arrive, the actuator 20 admits them to create an admitted task such as 46-1 or 46-2 only when doing so is in adherence with the budget policy 60. The actuator 20 is able to work with a parameterized range of these cost functions 52 and may treat the cost functions and budget policy components as vectors, throttling 22 the admission of tasks using a vector 24 of the rate limits 28, referred to as the rate limit vector 24.

The strategist 30 supplies the cost function vector 52 and the budget policy vector 62. The parameters of a cost function 50 may be chosen so that the cost 72 computed by the cost function is an estimate of the impact 26 of the admitted tasks 46-1 and 46-2 on the resources 70 controlled by the computer system 10. In a computer system 10 of typical complexity, these vectors 24, 52 and 62 relate to the many dimensions of impact 26 upon the resources 70 that must be taken into account to optimize the system performance 72. For example, the computer system 10 may control tasks 46-1 and 46-2 using one or more buses with limited bandwidth, one or more peripherals with limited throughput, and so on. Any given cost function 50 may account for one dimension of the resource interactions in which contention 76 may be evident or possible, and the budget policy 60 may be chosen to relieve or prevent that contention 76.

Any given cost function 50 may account for an impact 26 that affects system value 74 or system cost that is not related to the possibility of contention. For example, if a resource 70 is subject to wear or degradation through usage then the cost function 50 may estimate the share of replacement or maintenance cost attributable to usage from the admitted task 46-1. For another example, an admitted task 46-2 may have the impact of increasing heat generation and the load on a limited capacity refrigeration unit.

The budget policy 60 defines how a rate limit 28 is to be imposed. The budget policy 60 determines if and when a task request 42 whose cost function 50 yields a given value is to be admitted. In one preferred embodiment, the budget policy 60 defines the parameters for token-bucket rate limit 24 using a separate rate limit 28 for each tenant 40. Other embodiments may provide for sharing of unused token credits among tenants 40-1 to 40-N, for example.

In general, the value 74 of the computer system 10 may be lowered if the actuator 20 admits task requests 42 from a tenant such as 40-1 either too quickly or too slowly. If task requests 42 are admitted too quickly, that tenant's tasks, for example, admitted task 46-1 will have an excessive impact 26 on the other tasks 46-2 of other tenants such as 40-N, and that impact on the resource 70 may decrease the value 74 of the overall system performance 72. If the actuator 20 admits tasks too slowly, then the performance of admitted tasks 46-1 of the tenant 40-1 is decreased enough to decrease the value 74 of the overall system performance 72. The strategist 30 may be configured to create the cost functions 50 and the budget policies 60 that maximize the value 74, based on its observations of the admitted tasks 46-1 and 46-2 and the past behavior of the overall system performance 72.

Control accuracy may be defined as the ability of the computer system 10 to operate in a way that maximizes the value 74. The use of the cost function vector 52 to control the actuator 20 as directed by the strategist 30 results in improved control accuracy, in that the rates 24 of tasks admitted by the actuator 20 are close to optimal in more situations. This improvement in control accuracy may be particularly evident when a tenant, for example, 40-1 changes the pattern of task requests 42 it sends. A change in the task pattern, for example, in the ratio of reads to writes may require changes in the throttling actions of the actuator. Previously, such changes might be achieved through the delivery of new rate limits 24. In the prior art this often leads to over throttling or under throttling until the recalculated rate limits 28 are applied. As disclosed herein, the rate limits are formulated in a way that preserves the required behavior even when the task request pattern changes.

The embodiments provide improved control accuracy when the nature of the system bottlenecks or contention 76 changes. The strategist 30 may cope with many different kinds of bottlenecks or contentions 76 by creating different cost functions 50 to deliver to the actuator 20. There are many possible cost functions 50. The actuator 20 need not be redesigned, re-implemented, or retested for each variation of these cost functions 50.

Handling the task requests 42 is efficient, with the actuator 20 performing a small number of steps for lightweight tasks, such as single I/O operations, particularly when calculating the cost function 50 as a weighted sum of the requested task attributes.

Figure 2:
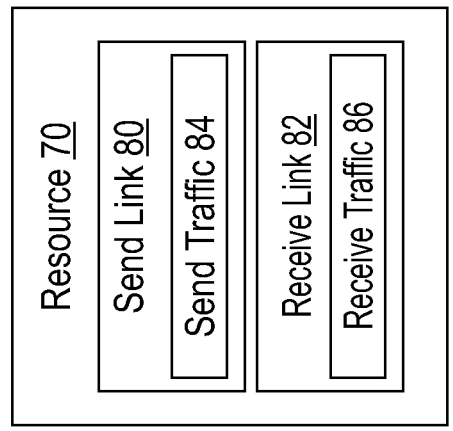
FIG. 2 is a diagrammatic illustration showing an embodiment of example of one of more than one resource operated by a computer system.

FIG. 2 shows an embodiment of a resource 70 as a full duplex connection with a send link 80 supporting a send traffic 84 and a receive link 82 supporting a receive traffic 86. If, for example, the resource 70 is controlled first with a scalar rate limit on the sum of the send traffic 84 and the receive traffic 86. Suppose further, that the send link 80 is overloaded, and a single low-priority tenant, say 40-1 issues task requests 42 that perform a 50%-50% mix of send traffic 84 and receive traffic 86, and the tenant 40-1 is being limited to a given rate, so as to leave the send capacity available for a high-priority tenant, for example 40-N. For the following examples, assume that any link has a capacity of 100, as in percent. Specifically, the rate of send traffic 84 should be limited to 100.

In this case, a scalar rate limit on the send traffic 84 plus the receive traffic 86 could be set to 200, because the current 50-50 pattern of the task requests 42-1 means that a total rate of 200 will yield 100 sends. The scalar rate limit is useful while the 50-50 pattern of the task requests 42-1 continues. However, if the tenant 40-1 switches to 100% send traffic 84, the total of 200 will yield the send traffic 84 as 200, double the acceptable rate limit of the send traffic of 100. The high-priority tenant 40-N will be impacted 26 too much. If on the other hand the initial rate limit were set low, about to 100 for example, then the initial 50-50 pattern would limit the low-priority tenant 40-1 too severely. This situation is an example of poor control accuracy.

One phenomena the embodiments avoid is the following: suppose there is a change in the pattern of task requests 42, such as in the ratio of reads to writes, may require recalculation of the rate limits 28, and until the recalculated rate limits are applied, there will often be over throttling or under throttling.

As discussed herein, the embodiments formulate the rate limits 28 in a way that preserves the required behavior even when the pattern of task requests 42 changes, because the rate limits 28 are associated with a load metric that is that is to be throttled 22.

A second situation in which the embodiments may provide improved control accuracy arises when the nature of system bottlenecks or contentions 76 changes. The strategist 30 can cope with many different kinds of bottlenecks 76 by specifying different cost functions 50 to deliver to the actuator 20. There is a wide range of possible cost functions 50. The actuator 20 need not be redesigned, re-implemented, or retested for each variation of these cost functions. The language of the cost function specification 50 gives enough room for variation that a range of different bottlenecks or contentions 76 may be handled.

Consider again the example of FIG. 2. A second way to address the example is to use an actuator 20 capable of applying separate simultaneously applied rate limits 28 on the send traffic 84, the receive traffic 86, and their total. However, suppose a new system limit is found in which the send traffic 84 is more costly than the receive traffic 86, because of power considerations, for example. Assume the low-priority tenant's 40-1 budget should be (3×SENDS+RECEIVES)<=300, and the tenant should be allowed that budget whatever mix of sends and receives that tenant offers. Using a previous actuator 20 that only limits sends receives and total, the desired budget policy 60 cannot be expressed, and there would be situations where the tenant 40 is over throttled, under throttled, or both.

Figure 3:
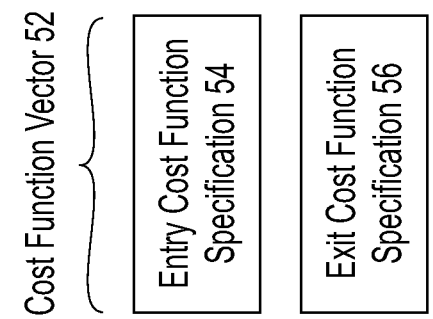
FIG. 3 is a diagrammatic illustration showing an embodiment of a cost function vector including an exit cost function.

FIG. 3 shows an embodiment of the cost function vector 52 that may involve two cost functions for at least one of the rate limits 28. One is an entry-cost function 54, which is evaluated using the attributes of an admitted task such as 42 at admission time that may create the admitted task 46-1. The other is an exit-cost function 56, which can take into account attributes known only after processing the admitted task 46-1, for example whether a data-read request was a cache hit or miss. The actuator 20 may modify the accounting variables used to apply rate limit 28 to deal with exit-time corrections as calculated by the exit-cost function 56, so that in most circumstances the rate limit accurately accounts for these exit costs.

Embodiments may use various forms of the cost function specification 50. With respect to FIG. 4, each cost function 50 may be a function that can be computed from the values of a task attributes 92 of the task request 42. The actuator 20 is able to compute the value of all attributes 92 for a given task request 42.

Figure 4:
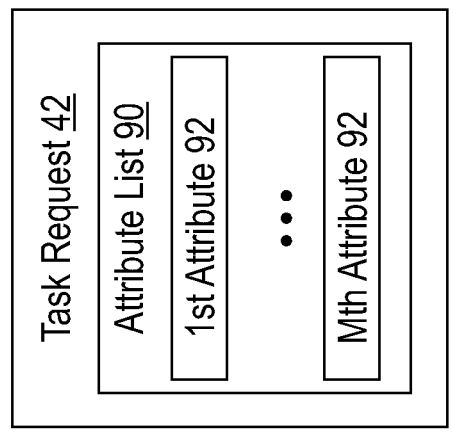
FIG. 4 is a diagrammatic illustration showing an embodiment of a task request including an attribute list.

FIG. 4 shows that a task request 42 may include an attribute list 90 of attributes 92 selected according to the kind of task to be performed by the resource 70, according to one embodiment. The attribute 92 may designate the impact 26 of performing the admitted task, such as 46-1, on the resource 70, such as various forms of cost 72 and/or contention 76. Note that the task request 42 may include attributes 92 designating impacts 26 on more than one resource 70, such as a data transfer from one data storage resource to another data storage resource. The attribute list 90 may not be associated with a single resource 70. For example, a data transfer size may be contained in a task request 42 that may not specify which of the resources 70 are used by it (for example, which of several temporary storage units might be used, or paths through networks or buses). However, in certain embodiments, the task request 42 may include attributes 92 unique to a specific resource 70, such as an encryption mechanism.

In the case of a resource 70 for a storage system, the attributes list 90 is likely to include simple attributes 92 such as the number of bytes being read, the number of bytes being written, and the total number of bytes transferred. It is also likely to include indicator attributes for conditions such as: the task is a read; the task is a write; the task is a read cache hit; the task is part of a sequential stream; the task is involved in data mirroring; and others specific to the features of the storage system. The attribute list 90 may also include combinations of simpler attributes 92, such as a product of the size in bytes multiplied by one or more indicator attributes. The attributes 92 in the attribute list 90 may be linearly independent or linearly dependent.

In one embodiment, the cost function 50 is expressed as a weighted sum of attributes. In this embodiment, the cost function specification 50 contains a list, or vector, of weights, one per attribute. That list may be considered as a "price list". Each entry in the price list may estimate the impact 26 to the cost 72 of the admitted task, say 46-1 by each of its attributes 92, in the task request 42. Each attribute is multiplied by the corresponding weight, and the products are added to obtain the cost value. Such a cost function is therefore referred to as a weighted sum of attributes. One embodiment that uses the weighted-sum-of-attributes approach expresses the cost function specification 50 as a flat vector containing a weight value for each possible attribute. A second embodiment is that the cost function specification 50 is a sparse representation of the cost function 52 which uses a list of pairs, each pair containing a coefficient value and an identification of a task attribute.

A third embodiment for representing the cost function specification 50 may be that the task attributes in a sparse representation are specified in a product form. This sparse representation may use a set of primitive attributes for a given admitted task 46-1. The space of possible attributes may include all possible products of those primitive attributes, which may be described mathematically as monomials. The products may be restricted to a maximum total degree of the product and a maximum degree on the terms of the product. This choice enables a very large number of useful attributes to be supported with a small amount of code in the actuator 20 and with a compact message size of the cost function specification 50 sent by the strategist 30 to the actuator 20.

As an example, an embodiment that uses the product form may specify a task attribute equal to the number of bytes being written and involved in data mirroring. That attribute may be formulated as the product of three attributes: the data size attribute, the indicator attribute for a write, and the indicator attribute for being involved in data mirroring. The product of these would evaluate to zero for any task which is not a write or is not involved in data mirroring. Such an embodiment may set a limit on the total data rate of writes involved in data mirroring. That may yield improved control accuracy in protecting a resource 70 whose contention 76 is caused only by the volume of data contained writes involved in data mirroring.

Additionally, there are situations in which the computer system 10 displays improved run-time efficiency in handling each admitted task 46 and/or in actuating 20 the task requests 42. The actuator 20 may perform a small number of steps on lightweight task requests 42 such as single I/O operations, particularly when calculating the cost function 50 as a weighted sum of task attributes.

The attribute list 90 may be known to the actuator 20 and to the strategist 30. The cost function 50 may be specified by the weights with which the weighted sum of attributes 92 may be computed by the actuator 20.

Consider an example of a storage system. The resource 70 (storage system) includes several disk drives operating in a RAID-5 storage scheme to provide data protection. The performance limiting bottleneck or contention 76 may be the aggregate rate of disk seeks in this resource. A disk seek causes the disks to seek a location. Different admitted tasks 46-1 and 46-2 may differently increment the number of disk seeks, as follows:

A read miss causes a single disk seek to read the first unit of data, plus (in the case of larger reads) an additional seek for each strip after the first. Thus there is a weight of 1.0 for the read-miss attribute 92, and a weight of (1/strip size) for (bytes read in misses, beyond the first strip) in the cost function specification 50.

A sequential read is normally serviced as a cache hit, but it contributes to the disk seeks needed to sustain the sequential prefetch stream, with a weight of (1/strip size) per byte in the cost function specification 50.

A cache-hit read that is not part of a sequential stream (a "random read hit") causes no additional disk seek.

A small, randomly placed write is buffered, and eventually causes 4 disk seeks, because of the parity update overhead.

A sequential write is buffered and contributes to a stream of full-stripe writes, with a weight of ((1+beta)/strip size) per byte in the cost function specification 50, where beta reflects the parity overhead.

The precise values of the weights depend on the details of the attribute list 90.

In certain embodiments, the system 10 may direct data storage services as resources 70 to achieve infrastructure consolidation, such as the integration of multiple operating systems and/or middleware and/or applications into a single system environment. These computer systems 10 may be configured and used as large-scale data storage servers. The disclosed computer system 10 addresses the long-standing issues of workload contention where one tenant 40-1 imposes a heavy impact 26 on the system resources 70 leading to a degradation of the value 74. The value 74 may include the system performance 72, and/or an estimate of the Quality of Service 73, collectively offered to the tenants 40-1 to 40-N.

The actuator 20 and the strategist 30 may implement a throttling 22 approach to task management based upon maximizing the value 74 of the computer system 10 in terms of quality of service 73 and/or the system performance 72. This approach can gracefully control Input/Output (I/O) rates of less important, or lower priority, I/O streams while carefully relieving contention 76 to the point where higher priority I/O streams meet their targeted requirements.

FIG. 5 to FIG. 7 are functional block diagrams that show embodiments of various implementations of the system 10, which may not be mutually exclusive. FIG. 5 shows an embodiment of the computer system 10 including at least one computer 100 that implements the actuator 20 and/or the strategist 30. FIG. 6 shows a variation of the embodiment of the computer system 10 of FIG. 5, where the computer 100 accesses a memory 110 across a bus 102 to implement the actuator 20 and/or the strategist 30, possibly as program instructions. FIG. 7 shows a variation of the embodiment of the computer system 10 including two or more redundant computers 100 that implement the actuator 20 and/or the strategist 30, possibly to provide a fault tolerance for the system 10.

As used herein, the memory 110 is an example of a program code product that may include any combination of one or more computer readable medium(s). The computer readable medium may be a computer readable signal medium or a computer readable storage medium.

Figure 8:
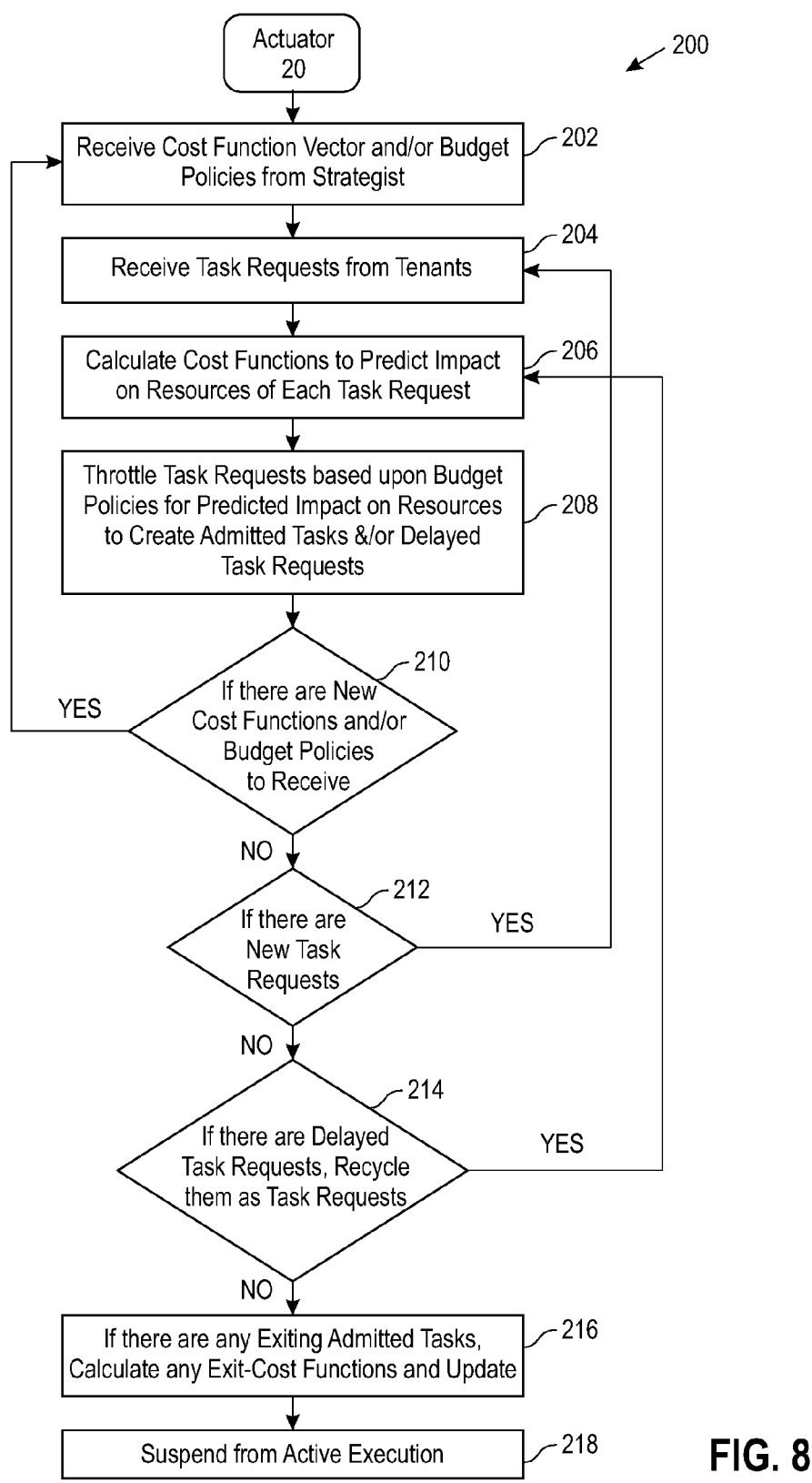
FIG. 8 is a flow diagram showing an embodiment of an execution of operating a computer system as an actuator.

FIG. 8 shows an embodiment of a method 200 of operating the actuator 20 including the following steps that may implement program code residing in the memory 110 for access by the computer 100, possibly across the bus 102. Step 202 receives at least one cost function specification 50 and/or at least one budget policy 60 from the strategist 30. Receiving the cost function specification 50 may further include possibly receiving the cost function vector 52. Receiving the budget policy 60 may further include possibly receiving the budget policy vector 62.

Step 204 receives any new task requests 42 from the tenants 40-1 to 40-N.

Step 206 calculates the cost functions 50 to predict the impact 26 on the resources 70 of each task request 42.

Step 208 throttles the task requests 42 together with any delayed task requests 48 from prior iterations based upon the budget policies 60 for the predicted impact 26 on the resources 70 to create admitted tasks shown as 46-1 and 46-2 and/or delayed task requests 48 and/or rejected task requests 42.

Step 210 determines if there are new cost functions 50 and/or budget policies 60 to receive. If there are new cost functions 50 and/or budget policies 60 to receive, then the method 200 returns to step 202. If there are not new cost functions 50 and/or budget policies 60 to receive, then the method 200 proceeds to step 212. Note that the new cost function specifications 50 may replace previously received cost function specifications 50. Similarly, the new budget policies 60 may replace previously received budget policies 60.

Step 212 determines if there are new task requests 42. If there are new task requests 42, the method 200 returns to step 204, otherwise the method 200 proceeds to step 214.

Step 214 determines if there are any delayed task requests 48. If there are delayed task requests 48, the method 200 returns to step 206, otherwise the method 200 proceeds to step 216.

Step 216 determines if there are any exiting admitted tasks 46-1 or 46-2 and if yes, calculates any exit-cost functions 56 and updates the relevant rate limits 28, impacts 26, and possibly other system parameters of the resources 70.

Step 216 determines if there are any exiting admitted tasks 46-1 or 46-2 and if yes, calculates any exit-cost functions 56 and updates the relevant rate limits 28, impacts 26, and possibly other system parameters of the resources 70.

Step 218 functions to suspend the actuator 20 from active execution, until a message from the strategist 30 is received, or a message from the tenants 40-1 to 40-N is received, or the time delay determined from the budget policy 60 has passed. If there are any delayed task requests 48 (shown in FIG. 1) then the time delay is a finite time. The passage of time may change the evaluation of the throttle decision at step 206 for the delayed task requests 48. For example, in an embodiment where the budget policy 60 is a token-bucket rate limit 28, tokens are made available over time and allow previously delayed task requests 48 to be admitted later as admitted tasks 46. If there are no delayed task requests 48 then it is not necessary to leave the bubble until a message is received. When one of the events occurs, execution resumes at step 202. One of ordinary skill in the art will recognize that there may be many embodiments of a token-bucket budget policy 60 with different procedures than those in FIG. 8, and that embodiments using different budget policies 60 may require different procedures than those in FIG. 8.

Figure 9:
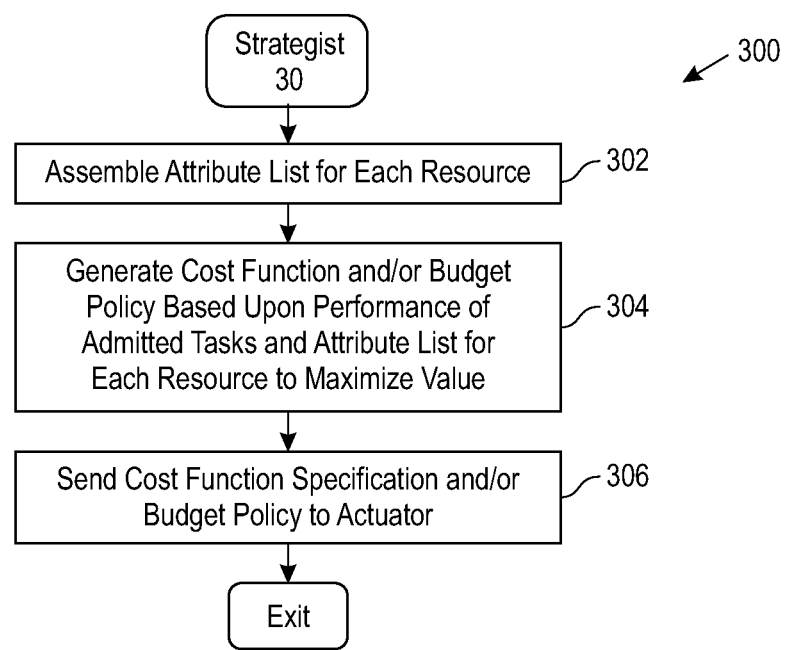
FIG. 9 is a flow diagram showing an embodiment of an execution of operating a computer system as a strategist.

FIG. 9 is an embodiment of a method 300 for operating the strategist 30 including the following steps that may implement program code residing in the memory 110 for access by the computer 100, possibly across the bus 102. Step 302 assembles an attribute list 90. The available attributes 92 that can be handled by the actuator 20 may change as new resources 70 are added into the computer system 10 or as older resources 70 are retired from the computer system 10, and step 302 may be repeated then.

Step 304 generates one or more cost function specifications 50 and/or one or more budget policies 60 based upon performance of the admitted tasks 46-1 and/or 46-2 and the attribute list 90 for each of the resources 70 to maximize the value 74 of the computer system 10.

Step 306 sends the cost function specification 50 and/or the budget policy 60 to the actuator 20. The method 300 then exits at step 308.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system comprising:
at least one resource configured to perform at least one admitted task, the at least one admitted task admitted by a computer system, the computer system providing services to more than one tenant, the computer system comprising:
a strategist for creating a cost function vector comprising multiple cost function specifications and a budget policy vector comprising multiple budget policies; and
an actuator, the actuator comprising a processor configured for:
receiving the cost function vector and the budget policy vector from the strategist, receiving at least one task request associated with one of the more than one tenants,
calculating cost functions based upon the cost function vector to predict an impact of the at least one task request on the at least one resource for each of the at least one task requests, wherein the cost function vector predicts a share of a replacement or maintenance cost attributable to resource usage of the at least one task request based on a performance degradation of the at least one resource, and throttling the at least one task request based upon the cost functions and the budget policies for the predicted impact on the at least one resource to create at least one of the admitted task performed by the at least one resource and a delayed task request.

2. The system of claim 1, wherein the actuator performs an exit-cost function in response to the admitted task performing on the at least one resource when the admitted task is exiting.

3. The system of claim 1, wherein the computer system further comprises at least one computer configured to perform at least one of the actuator and the strategist.

4. The system of claim 3, wherein a redundant version of the at least one computer is configured to perform the actuator.

5. The system of claim 3, wherein a redundant version of the at least one computer is configured to perform the strategist.

6. The system of claim 3, wherein the at least one computer is further configured to perform both the actuator and the strategist.

7. The system of claim 3, further comprising a memory containing program code to implement at least one of:
operating the at least one computer as the actuator; and
operating the computer as the strategist.

8. The system of claim 7, wherein operating the at least one computer as the strategist further comprises:
assembling an attribute list;
generating at least one cost function specification and at least one budget policy based upon performance of the admitted tasks and the attribute list for each of the at least one resource to maximize a value of the computer system; and sending at least one of the cost function specification and the budget policy to the actuator.

9. The system of claim 7, wherein operating the at least one computer as the actuator further comprises:
receiving the cost function vector and the budget policy vector from the strategist;
receiving the task request from the at least one tenant;
calculating the cost values based upon the cost function vector to predict the predicted impact of the at least one task request on the at least one resource for each of the task requests; and
throttling the at least one task request based upon the budget policies for the predicted impact on the at least one resource to create at least one of the admitted task performed by the at least one resource and the delayed task request.

10. A method comprising:
operating a computer system as a strategist to assess a predicted impact of at least one resource performing an admitted task and to create a cost function vector comprising multiple cost function specifications and a budget policy vector comprising multiple budget policies, the computer system providing services to at least two tenants; and
operating the computer system as an actuator, the actuator
receiving the cost function vector and the budget policy vector from the strategist,
receiving at least one task request from one of the tenants,
calculating cost functions based upon the cost function vector to predict the predicted impact of the at least one task request on the at least one resource for each task request, wherein the cost function vector predicts a share of a replacement or maintenance cost attributable to resource usage of the at least one task request based on a performance degradation of the at least one resource, and
throttling the at least one task request based upon the budget policies for the predicted impact on the at least one resource to create at least one of the admitted task performed by the resource and a delayed task request.

11. The method of claim 10, wherein operating the computer system as the actuator further comprises:
calculating an exit-cost function in response to the admitted task performing on the at least one resource when the admitted task is exiting.

12. The method of claim 10, further comprising the computer system operating as a redundant computer to perform the actuator.

13. The method of claim 10, further comprising the computer system operating as a redundant computer to perform the strategist.

14. The method of claim 10, wherein the operating computer system as the strategist further comprises:
assembling an attribute list for each of the resources;
generating at least one cost function specification and at least one budget policy based upon performance of the admitted tasks and the attribute list for each of the at least one resources to maximize a value of the computer system; and
sending at least one of the cost function specification and the budget policy to the actuator.

15. The method of claim 10, wherein operating the computer system as the actuator further comprises:
receiving the cost function vector and the budget policy vector from the strategist;
receiving the at least one task request from the at least two tenants;
calculating the cost functions based upon the cost function vector to predict the predicted impact of the at least one task request on the at least one resource for each task request; and
throttling the at least one task requests based upon the budget policies for the predicted impact on the at least one resources to create at least one of the admitted task performed by the at least one resource and the delayed task request.

16. A computer program product, comprising:
a non-transitory computer readable storage medium having computer readable program code embodied therewith, the computer readable program code comprising:
computer readable program code configured to operate a computer system as a strategist to assess a predicted impact of an admitted task performed on a resource to create a cost function vector containing multiple cost function specifications and a budget policy vector containing multiple budget policies, with the computer system providing services to at least two tenants; and
computer readable program code configured to operate the computer system as an actuator, the actuator comprising:
computer readable program code configured to receive the cost function vector and the budget policy vector from the strategist, computer readable program code configured to receive a task request from at least one of the tenants,
computer readable program code configured to calculate cost functions based upon the cost function vector to predict an impact of the task request on the resource for each task request received, wherein the cost function vector predicts a share of a replacement or maintenance cost attributable to resource usage of the at least one task request based on a performance degradation of the at least one resource, and computer readable program code configured to throttle each task request based upon the budget policies for the predicted impact on the resource to create at least one of the admitted task performed by the resource and a delayed task request.

17. The computer program product of claim 16 further comprising:

computer readable program code configured to operate the computer system as the actuator, the actuator further comprising:

computer readable program code configured to calculate an exit-cost function in response to the admitted task performing on the at least one resource when the admitted task is exiting.

18. The computer program product of claim 16 further comprising:

computer readable program code configured to operate the computer system as the strategist, the strategist further comprising:

computer readable program code configured to assemble an attribute list for each resource;

computer readable program code configured to generate at least one cost function specification and at least one budget policy based upon performance of the admitted tasks and the attribute list for each of the resources to maximize a value of the computer system; and computer readable program code configured to send at least one of the cost function specification and the budget policy to the actuator.

19. The computer program product of claim 16 further comprising:

computer readable program code configured to operate the computer system as the actuator, the actuator further comprising:

computer readable program code configured to receive the cost function vector and the budget policy vector from the strategist; computer readable program code configured to receive the task request from a tenant;

computer readable program code configured to calculate the cost functions based upon the cost function vector to predict the impact of the task request on the resource for each task request received; and computer readable program code configured to throttle task requests based upon the budget policies for the impact on the resource to create at least one of the admitted task performed by the resource and the delayed task request.

20. The computer program product of claim 16 further comprising:

computer readable program code configured to calculate at least one exit-cost function in response to the admitted task performing on the resource when the admitted task is exiting.

* * * * *